UNITED STATES PATENT OFFICE.

CAROLINE V. SUTHERLAND, OF LATHROP, CALIFORNIA.

OINTMENT.

SPECIFICATION forming part of Letters Patent No. 400,967, dated April 9, 1889.

Application filed October 19, 1888. Serial No. 288,598. (No specimens.)

*To all whom it may concern:*

Be it known I, CAROLINE V. SUTHERLAND, a citizen of the United States, residing at Lathrop, in the county of San Joaquin and State of California, have invented certain new and useful Improvements in Medical Compounds, as a Salve; and I do declare the following to be a full, clear, and exact description of the invention, such as will enable others skilled in the art to which it appertains to make and use the same.

The said medical compound consists of the following ingredients combined in about the proportions stated. Twigs and leaves of wormwood, (*Artemisia absinthium*,) one hundred pounds; stalks and leaves of the rosin-weed, (*Silphium laciniatum*,) fifty pounds; stalks, leaves, and flowers of the yarrow, (*Achillea millefolium*,) fifteen pounds; stalks and leaves of the thorn-apple, (*Datura stramonium*,) one hundred pounds; twigs and leaves of the Australian blue gum, (*Eucalyptus globulus*,) ten pounds; stalks and leaves of the plantain, (*Plantago major*,) five pounds; beeswax, twenty pounds; fresh hogs lard, ninety pounds; camphor, eight pounds.

The plants, &c., are first chopped up and then thoroughly steeped by boiling in a sufficient quantity of water until the product forms a pulpy extract of about one gallon. The beeswax and lard are then melted together. The pulp above mentioned and the camphor are added to it and all thoroughly mingled, and when cooled the product is put in tin boxes for sale and use.

This salve is used in accordance with the following directions, to wit: For burns, dress twice a day; for granulated sore eyes, rub on inside and outside of the eyelids at night on going to bed; for bruises and sprains, apply freely by rubbing two or three times a day. It is very efficacious in cases of bloody flux, stings, bites, corns, itching piles, rheumatic pains, and all kinds of bruises.

What I claim, and desire to secure by Letters Patent, is—

The herein-described medical compound, as a salve, consisting of an extract from wormwood stalks and leaves; rosin-weed, stalks, and leaves; yarrow stalks, leaves, and flowers; thorn-apple stalks and leaves; Australian blue gum twigs and leaves; plantain stalks and leaves, with beeswax, fresh hogs lard and camphor, in the proportions specified.

In testimony whereof I affix my signature in presence of two witnesses.

CAROLINE V. SUTHERLAND.

Witessnes:
JOSHUA B. WEBSTER,
JAS. T. SUMMERVILLE.